US010331419B2

(12) United States Patent
Essenmacher et al.

(10) Patent No.: US 10,331,419 B2
(45) Date of Patent: Jun. 25, 2019

(54) CREATING COMPOSITE TEMPLATES FOR SERVICE INSTANCES

(71) Applicant: International Business Machines Corporation, Armonk, NY (US)

(72) Inventors: Michael D. Essenmacher, Danbury, CT (US); Galina Gorelik, Hyde Park, NY (US); Hiren R. Shah, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/826,765

(22) Filed: Nov. 30, 2017

(65) Prior Publication Data

US 2019/0163448 A1 May 30, 2019

(51) Int. Cl.

*G06F 9/44* (2018.01)
*G06F 8/34* (2018.01)
*G06F 8/35* (2018.01)

(52) U.S. Cl.

CPC . *G06F 8/34* (2013.01); *G06F 8/35* (2013.01)

(58) Field of Classification Search

CPC ........................................ G06F 8/34
USPC ........................................ 717/105
See application file for complete search history.

(56) References Cited

U.S. PATENT DOCUMENTS 5,586,326 A * 12/1996 Ryu .................. G06F 9/4492 717/104
7,086,009 B2 * 8/2006 Resnick .................. G06F 8/20 700/96
7,137,100 B2 * 11/2006 Iborra .................. G06F 8/30 717/106
7,222,334 B2 * 5/2007 Casati .................. G06Q 10/10 705/1.1
7,565,640 B2 * 7/2009 Shukla .................. G06F 8/10 717/105
7,707,550 B2 * 4/2010 Resnick .................. G05B 15/02 717/121
7,822,592 B2 * 10/2010 Hawkins .................. G06Q 99/00 703/17

(Continued)

OTHER PUBLICATIONS

Gandhi et al, "Estimation of Generic Reusability for Object-Oriented Software an Empirical Approach", ACM SIGSOFT Software Engineering Notes, vol. 36, No. 3, pp. 1-4, 2011 (Year: 2011).*

(Continued)

*Primary Examiner* — Anil Khatri
(74) *Attorney, Agent, or Firm* — Cantor Colburn LLP; William Kinnaman

(57) ABSTRACT

Embodiments include method, systems and computer program products for creating one or more composite templates. The method includes receiving, by one or more processors, a request to create composite template within a cloud environment. The one or more processors further receive a selection of two or more template members. The one or more processors further determine that any of the selected template members has variables. The one or more processors further resolve the variables of the selected template members. The one or more processors further package the selected template members upon the resolution of variables associated with the selected template members.

20 Claims, 14 Drawing Sheets

(56) References Cited

U.S. PATENT DOCUMENTS

| | | | | |
|---|---|---|---|---|
| 7,823,121 | B1 * | 10/2010 | Zarrinkoub | G06F 8/34 715/763 |
| 8,037,449 | B2 * | 10/2011 | Iborra | G06F 8/30 717/105 |
| 8,056,073 | B2 * | 11/2011 | Petersen | G06F 9/4488 717/170 |
| 8,266,616 | B1 | 9/2012 | Jacquot et al. | |
| 8,332,811 | B2 * | 12/2012 | Festa | G06Q 10/06 717/106 |
| 8,954,927 | B2 * | 2/2015 | Polly | G06Q 10/10 717/106 |
| 8,966,445 | B2 * | 2/2015 | Ahlgren | G06F 9/468 717/120 |
| 8,997,095 | B2 * | 3/2015 | Gupta | G06F 9/455 718/1 |
| 9,069,590 | B2 * | 6/2015 | Gupta | G06F 9/45558 |
| 9,357,034 | B2 | 5/2016 | Kumar et al. | |
| 9,411,570 | B2 | 8/2016 | Dehaan | |
| 9,529,852 | B1 * | 12/2016 | Tsun | G06F 17/30424 |
| 2016/0164753 | A1 | 6/2016 | Cimprich et al. | |
| 2017/0041189 | A1 | 2/2017 | Aswathanarayana et al. | |

OTHER PUBLICATIONS

Riaz et al, "Using Templates to Elicit Implied Security Requirements from Functional Requirements �� �� A Controlled Experiment", ACM, pp. 1-10, 2014 (Year: 2014).*

Amorim et al, "Adaptive Layouts and Nesting Templates for Hypermedia Composite Templates", ACM, pp. 189-196, 2015 (Year: 2015).*

Antequera et al, "Recommending Resources to Cloud Applications based on Custom Templates Composition", ACM, pp. 136-145, 2017 (Year: 2017).*

Geebelen et al, "Dynamic Reconfiguration Using Template Based Web Service Composition", ACM, pp. 49-54, 2008 (Year: 2008).*

Axelsen et al, "Adaptable Generic Programming with Required Type Specifications and Package Templates", ACM, pp. 83-94, 2012 (Year: 2012).*

List of IBM Patents or Patent Applications Treated as Related; Date Filed: Nov. 30, 2017, p. 1-2.

Michael D. Essenmacher, et al.,"Execution of a Composite Template to Provision a Composite of Software Service Instances", U.S. Appl. No. 15/826,767, filed Nov. 30, 2017.

Michael D. Essenmacher, et al.,"Performing an Action on a Composite of Software Instances", U.S. Appl. No. 15/826,770, filed Nov. 30, 2017.

Ralph Mietzner, et al.,"Cafe: A Generic Configurable Customizable Composite Cloud Application Framework", Springer-Verlag Berlin Heidelberg, 2009, p. 1-8.

Y. Katsuno, et al.,"An Automated Parallel Approach for Rapid Deployment of Composite Application Servers", IEEE International Confernece of Cloud Engineering, 2015, p. 1-9.

* cited by examiner

CREATING COMPOSITE TEMPLATES FOR SERVICE INSTANCES

BACKGROUND

The present invention relates to cloud computing, and more specifically, to creating and using composite templates for software service instances in a cloud environment.

In a cloud computing environment, cloud provisioning services are a set of application programming interfaces (APIs), which are implemented through industry standard Representational State Transfer (REST) services. These services allow service providers and consumers to perform software provisioning and create instances of desired applications or other software. The services are also used to create templates that can guide consumers in provisioning applications and services. Software that is provisioned from a template is known as a software services instance.

Cloud orchestration involves the end-to-end automation and coordination of multiple processes to deliver a desired service to its clients. The orchestration combines multiple tasks into workflows and ensures the performance of each of the tasks in a definite order with relation to one another, within a workflow.

SUMMARY

Embodiments of the invention are directed to a method for creating one or more composite templates. A non-limiting example of the computer-implemented method includes receiving, by one or more processors, a request to create a composite template within a cloud environment. The one or more processors further receive a selection of two or more template members. The one or more processors further determine that any of the selected template members has variables. The one or more processors further resolve the variables of the selected template members. The one or more processors further package the selected template members upon the resolution of variables associated with the selected template members.

Embodiments of the invention are directed to a computer program product that can include a storage medium readable by a processing circuit that can store instructions for execution by the processing circuit for performing a method for creating one or more composite templates. A non-limiting example of the computer-implemented method includes receiving a request to create a composite template within a cloud environment. The method further includes receiving a selection of two or more template members. The method further includes determining that any of the selected template members has variables. The method further includes resolving the variables of the selected template members. The method further includes packaging the selected template members upon the resolution of variables associated with the selected template members.

Embodiments of the invention are directed to a system. A non-limiting example of the system can include one or more processors in communication with one or more types of memory. The processor can be configured to receive a request to create a composite template within a cloud environment. The processor can be further configured to receive a selection of two or more template members. The processor can be further configured to determine that any of the selected template members has variables. The processor can be further configured to resolve the variables of the selected template members. The processor can be further configured to package the selected template members upon the resolution of variables associated with the selected template members.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
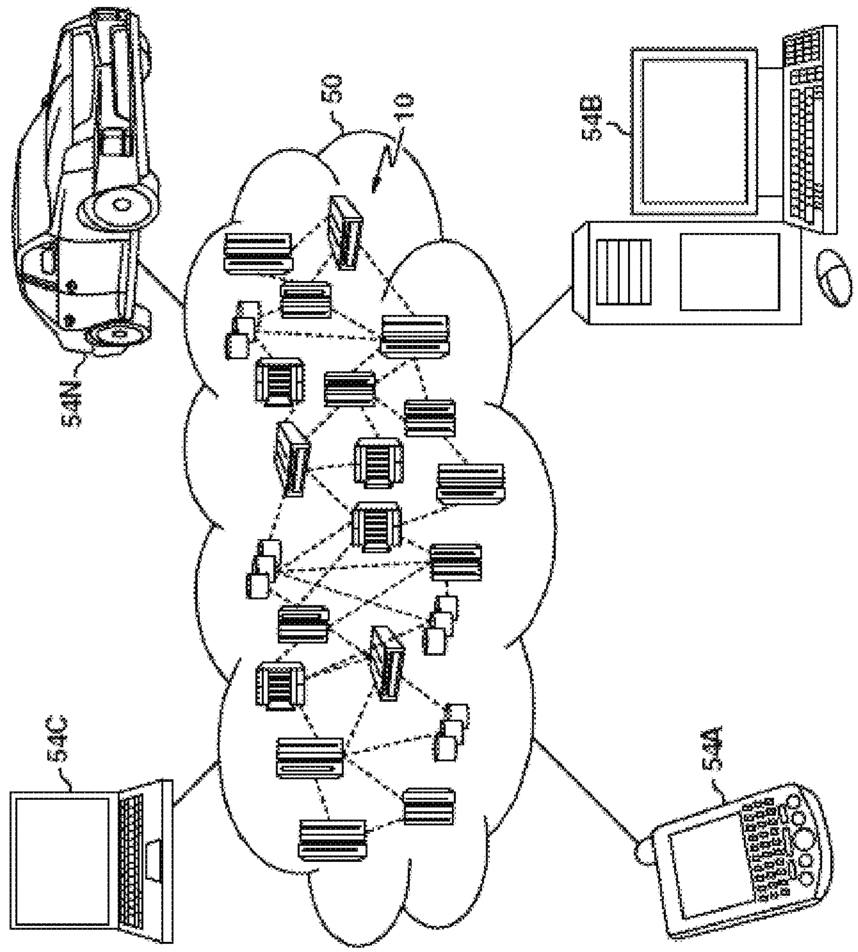
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): a software distribution model in which a third-party provider hosts applications and makes them available to customers over the Internet. SaaS removes the need for organizations to install and run applications on their own computers or in their own data centers. This eliminates the expense of hardware acquisition, provisioning, and maintenance, as well as software licensing, installation and support.

Platform as a Service (PaaS): a cloud computing model that delivers applications over the Internet. In a PaaS model, a cloud provider delivers hardware and software tools, for example, tools needed for application development, to users as a service. A PaaS provider can host the hardware and software on the PaaS provider's infrastructure. As a result, PaaS frees users from having to install in-house hardware and software to develop or run a new application.

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems may include monitoring engines to track performance and usage, error monitoring, and data analysis engines.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

When IaaS is used by a consumer, the consumer of the infrastructure becomes a tenant of the infrastructure. If multiple consumers exist for the infrastructure, a multi-tenant model exists. Multi-tenant implementations of SaaS, PaaS and DBaaS exist as well.

Orchestration is an automated coordination and management of computer resources and services, for example, in an IaaS, SaaS, PaaS or DBaaS. The orchestration provisions workloads operating within consumer specific environments; deploys consumer-specific software, middleware, tooling agents or antivirus programs; hardens workloads; integrates with directory services, and so on. An orchestration workflow (orchestration) can define a logical flow of activities or tasks from a start event to an end event to accomplish a specific service. There are many activities or tasks at the consumer's disposal to accomplish a specific service.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Building complex cloud computing environments using multiple services can be difficult and time consuming because consumers need to manually ensure that the multiple services operate in a sequence intended and have appropriate dependencies in order to complete one or more tasks within an orchestration. Moreover, when manually managing the multiple services, consumers can introduce errors by providing incorrect or incomplete input values or data to one or more of the services operating together when attempting to coordinate the operation of the multiple services. The introduction of errors can result in the consumer having to reenter the input value or data correctly upon the detection of an error. In addition, errors like improperly removing services from the cloud computing environment can result in the services lingering within the cloud computing environment that are no longer needed leading to unintentional resource consumption (unnecessary processor and/or memory usage).

In a cloud provisioning environment, a standard software service/template contains a definition and processing steps needed in order to provision an instance of a software service/template. However, the standard service/template has no indication of relationships with other standard software service templates unless manually ensuring that the standard software service templates operate together in a desired order and/or with a desired dependency. Accordingly, there is a need for a composite template that contains a combination of standard templates and a definition of the connections amongst (amongst recited herein can mean between or amongst) the software service instances where software instances have a relationship with other software instances.

Also, there is a need to provision a composite of software instances where some software instances have a relationship with other software instances. Today this relationship is established manually which slows down the availability of services within complex cloud environments.

Also, once a composite of software instances have been provisioned according to an orchestration, there is a need for additional actions to be performed on all instances of the composite software using a single request. These actions can be predefined by a service provider with a dynamic schema that provides flexibility and portability.

Turning now to an overview of aspects of the present invention, one or more embodiments of the invention provide methods, systems, and structures that lay out a framework for a composite of software services/templates (templates). A definition of the connections amongst software service instances can be created from the software templates when an instance of the composite template is created. Included in the connections can be ordering sequences and property variable input-output dependencies. When the software service instances for the composite are created the values of the property variable connections are dynamically retrieved and passed appropriately to other software service instances in the composite as needed.

Turning now to an overview of aspects of the present invention, one or more embodiments of the invention provide methods, systems, and structures that lay out a framework for an orchestration of potentially complex functions to be performed in order to provision a composite of provisioned software instances via a single request. Property variable input-output dependencies can be resolved dynamically during the provisioning of the composite template member instances which facilitate dynamic connectivity across various template member instances of the composite template.

Turning now to an overview of aspects of the present invention, one or more embodiments of the invention provide methods, systems and structures that lay out a framework for an orchestration of potentially complex actions to be performed on a composite of provisioned software instances and an ability to execute one or more actions on each instance using a single request. Processing can be done on each instance for the same action based on a definition associated with the action in the instance.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
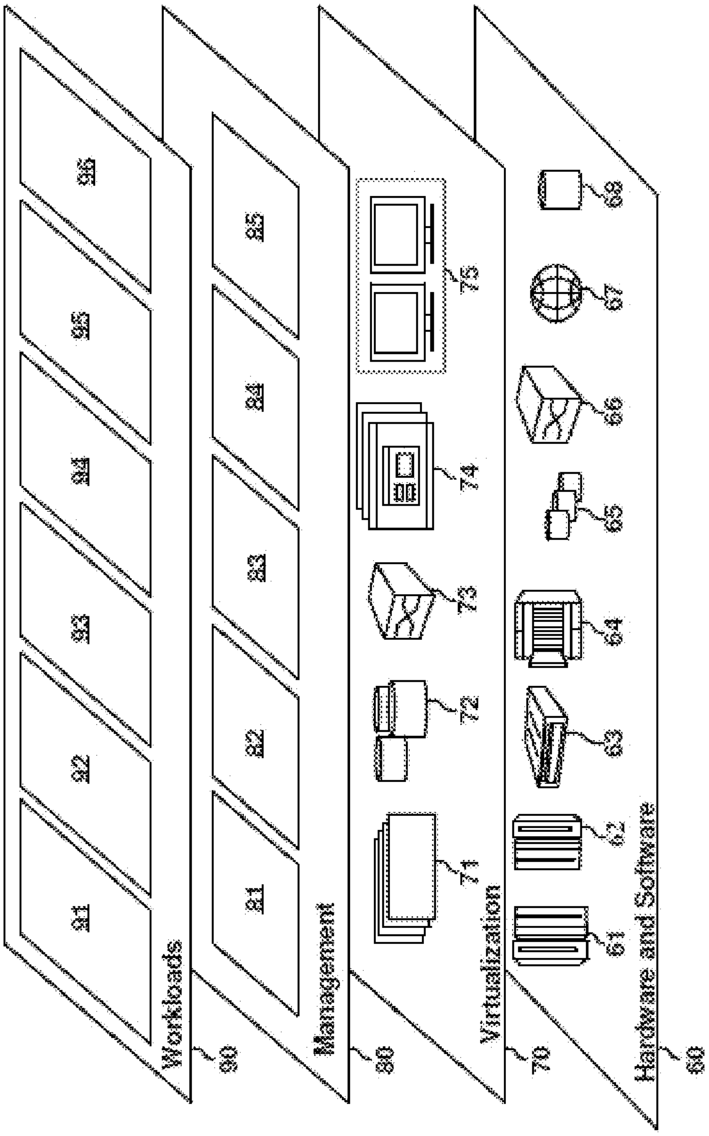
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and action analytics and notifications 96.

Figure 3:
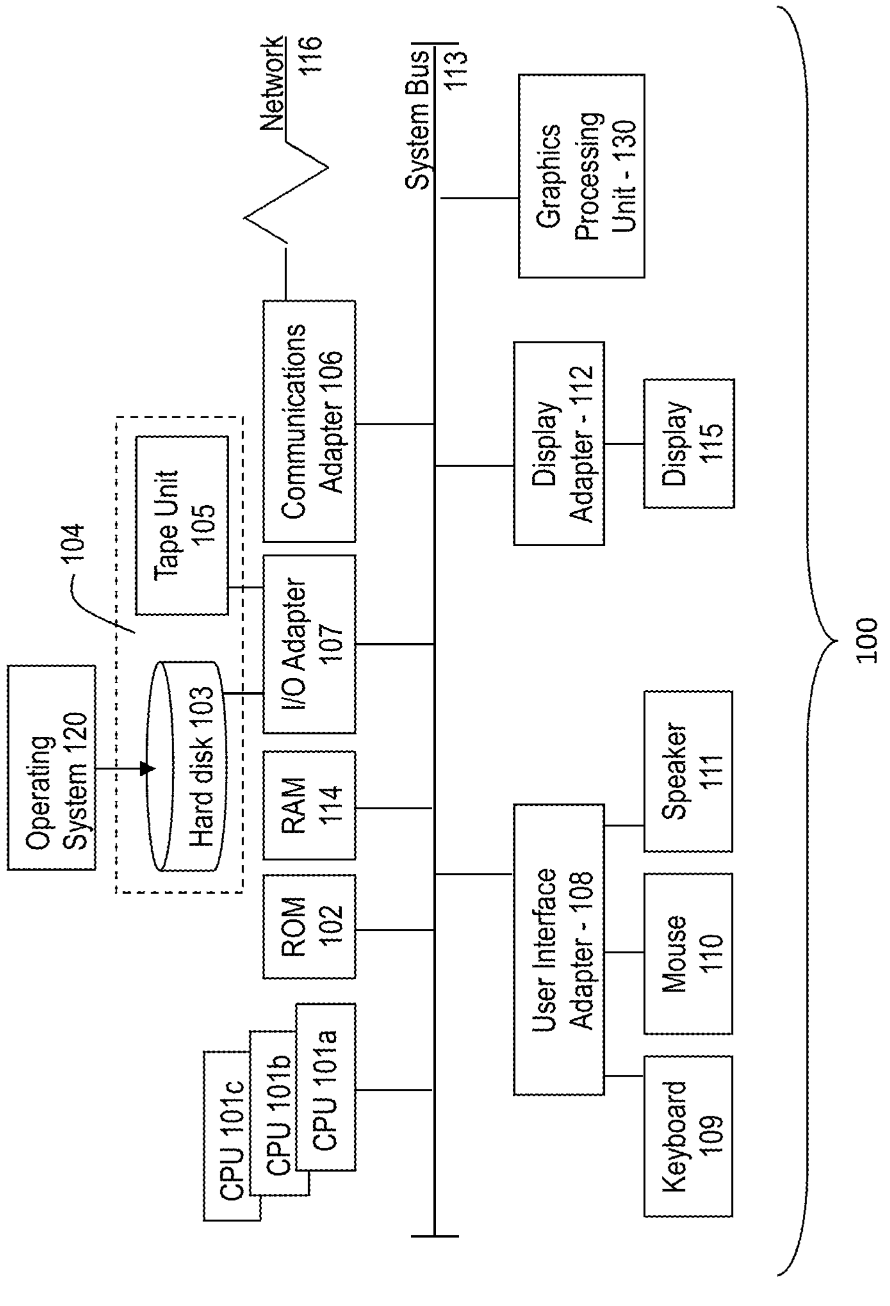
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
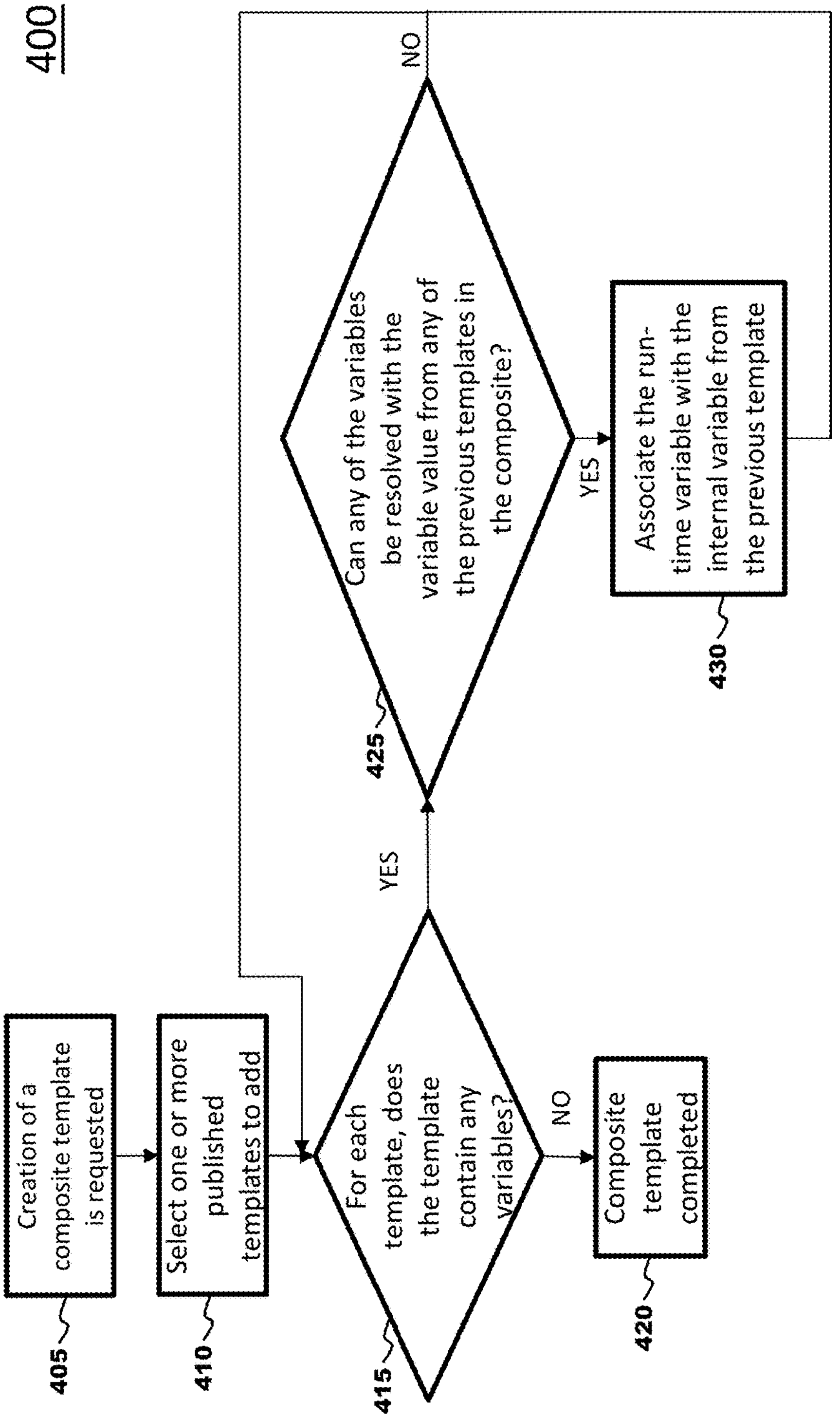
FIG. 4 is a flow diagram for creating composite templates according to one or more embodiments of the present invention.

FIG. 4 is a flow diagram 400 illustrating a method for creating composite templates according to one or more embodiments. At block 405, a request to create one or more composite templates is initiated within a cloud computing environment. At block 410, at least two of a plurality of templates members (ex., standard templates) are selected to be packaged together to form one or more composite templates. At block 415, for each template selected (i.e., new template), a determination is made to determine whether the new template has variables defined within the new template.

If the new template does not have variables, the method 400 ends at block 420 by completing the one or more composite templates by packaging the selected templates. If the new template has variables, the method 400 proceeds to block 425 where a determination is made to decide whether any variables in the new template can be resolved using values associated with any of the previously selected templates. If the variables of the new template can be resolved using values associated with any of the previously of the selected templates, the method 400 proceeds to block 430 where run-time variables for the new template are associated with at least one variable from the selected templates. If the variables of the new template cannot be resolved using values associated with any of the previously selected templates, the method 400 proceeds back to block 415.

Figure 5:
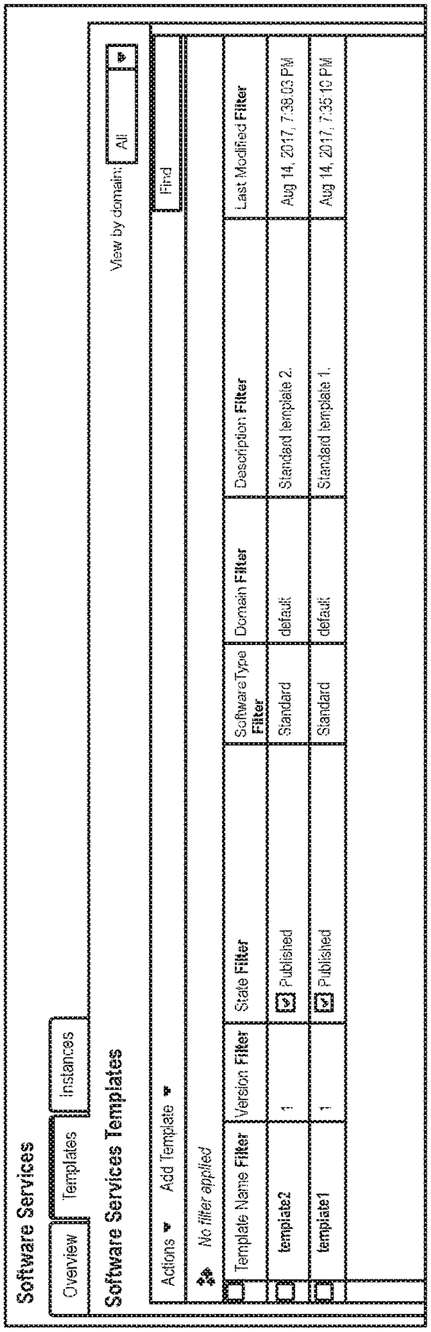
FIG. 5 illustrates a screen page which may be used when creating a composite template according to one or more embodiments of the present invention.
Figure 6:
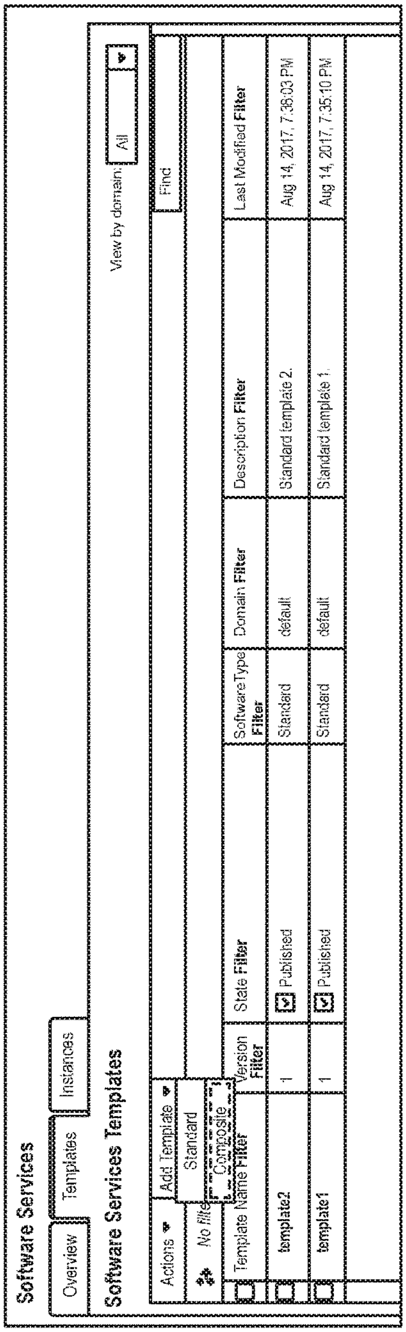
FIG. 6 illustrates a screen page which may be used when creating a composite template according to one or more embodiments of the present invention.

FIGS. 5-8 illustrate a plurality of screen pages which may be used when creating a composite template according to one or more embodiments. In FIG. 5, a consumer can view a listing of templates (ex., published standard templates) available for selection to create one or more composite templates. Each template can contain definitions and processing steps needed to provision one or more services. In FIG. 6, after selecting two or more templates from the listing, a provider can use a composite tab to package the selected templates.

Figure 7:
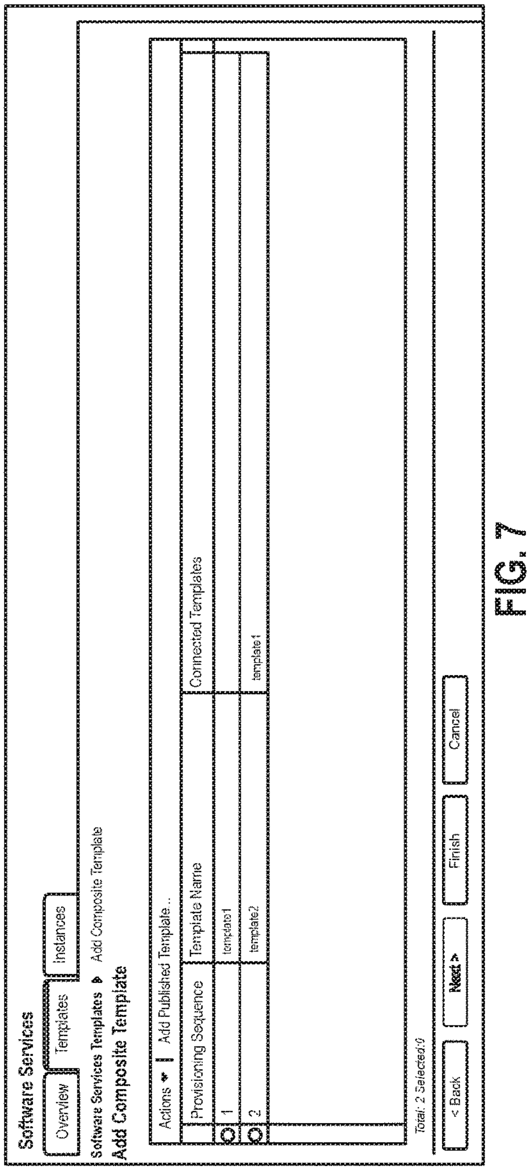
FIG. 7 illustrates a screen page which may be used when creating a composite template according to one or more embodiments of the present invention.
Figure 8:
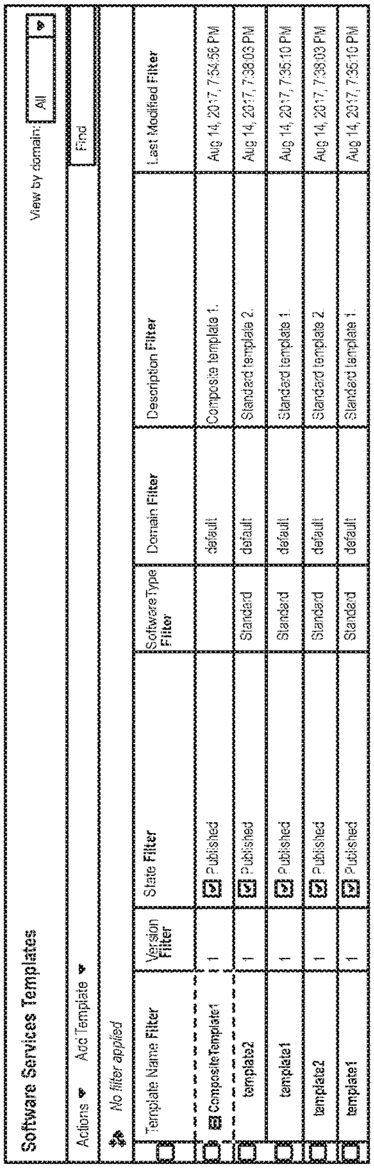
FIG. 8 illustrates a screen page which may be used when creating a composite template according to one or more embodiments of the present invention.

In FIG. 7, property variable input-output dependencies for the selected templates can be established using connector variables. The property variable input-output dependencies can be used to form composite connections between the selected templates. The composite connections can include a sequence number associated with each template. When the selected templates are dependent upon one another and/or should be executed in a particular sequence/order, the sequence number associated with each selected templated can be used to ensure that a proper dependency and/or sequence occurs upon the execution of the selected templates. Accordingly, ordering for software service instance creation can be identified using a sequence number mechanism associated with a connection definition. However, if order dependency is not needed, then the composite software service instances can be created in parallel. FIG. 8 illustrates the composite template after the selected templates have been published including any dependencies and/or sequencing.

Accordingly, a provider can package multiple templates having correct dependencies and/or sequencing into a composite template. The provider can then publish the template allowing a consumer to use a single request (click) to execute the composite template. The composite template can, therefore, execute a plurality of consumer selected templates automatically with desired dependencies and/or sequencing thereby increasing execution efficiencies by reducing time to execute multiple templates and errors potential introduced through manual template coordination of the multiple templates using one or more scripts.

Figure 9:
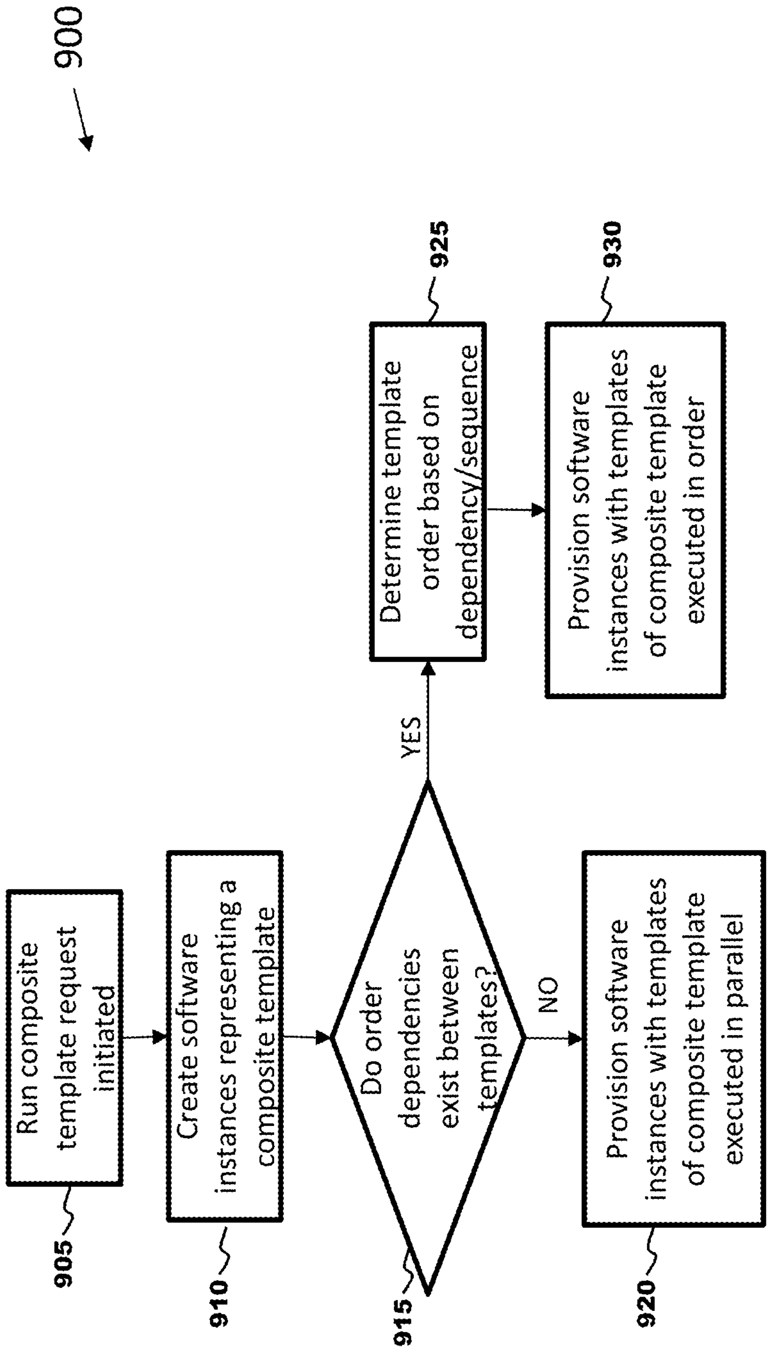
FIG. 9 is a flow diagram illustrating a method for executing composite templates to provision/orchestrate composite software service instances according to one or more embodiments of the present invention.

FIG. 9 is a flow diagram 900 illustrating a method for executing composite templates to provision/orchestrate composite software service instances according to one or more embodiments. At block 905, a run composite template function is requested to initiate provisioning of one or more composite software service instances. At block 910, one or more software instances are created to represent a composite template. At block 915, for each template in the composite template, a decision is made to determine whether dependencies exist amongst templates within the composite template. If dependencies do not exist amongst templates, the method 900 proceeds to block 920, where each template within the composite template can be provisioned and executed in parallel. Accordingly, provisioning for each software service instance can be accomplished using definitions associated with each individual template.

If dependencies do exist between or amongst templates, the method 900 proceeds to block 925, where an order for provisioning each template of the composite template is determined. The order can be related to dependencies and/or sequencing between the templates. At block 930, each template within the composite template can be executed according to the determined order. Accordingly, provisioning for each software service instance can be accomplished using definitions associated with each template of the composite template in a determined order. In addition, variables related to input-output dependencies associated with each template can be resolved dynamically while provisioning occurs.

Figure 10:
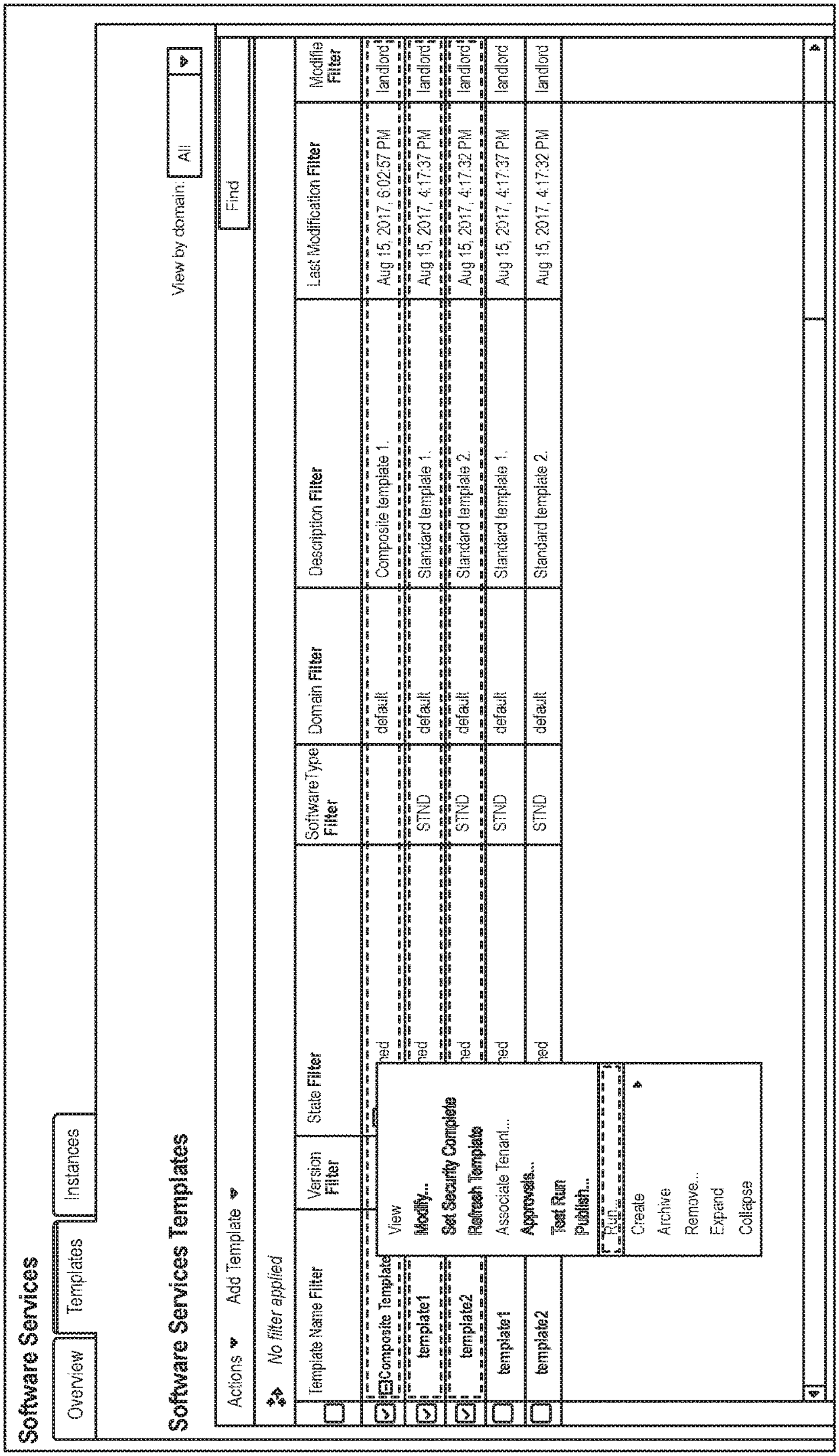
FIG. 10 illustrates a screen page which may be used to execute a composite template to provision a composite of software service instances according to one or more embodiments of the present invention.
Figure 11:
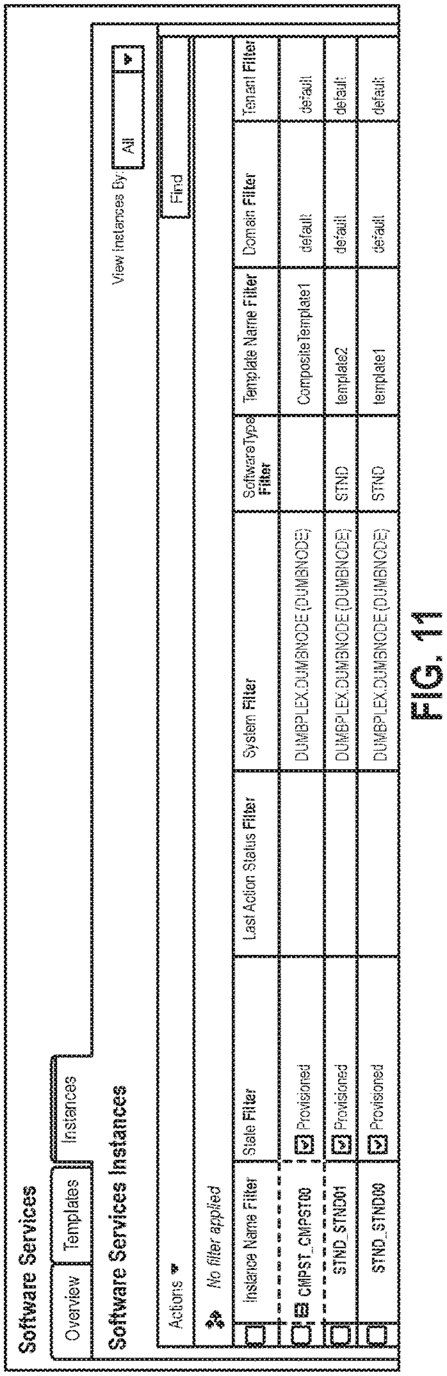
FIG. 11 illustrates a screen page which may be used to execute a composite template to provision a composite of software service instances according to one or more embodiments of the present invention.
Figure 12:
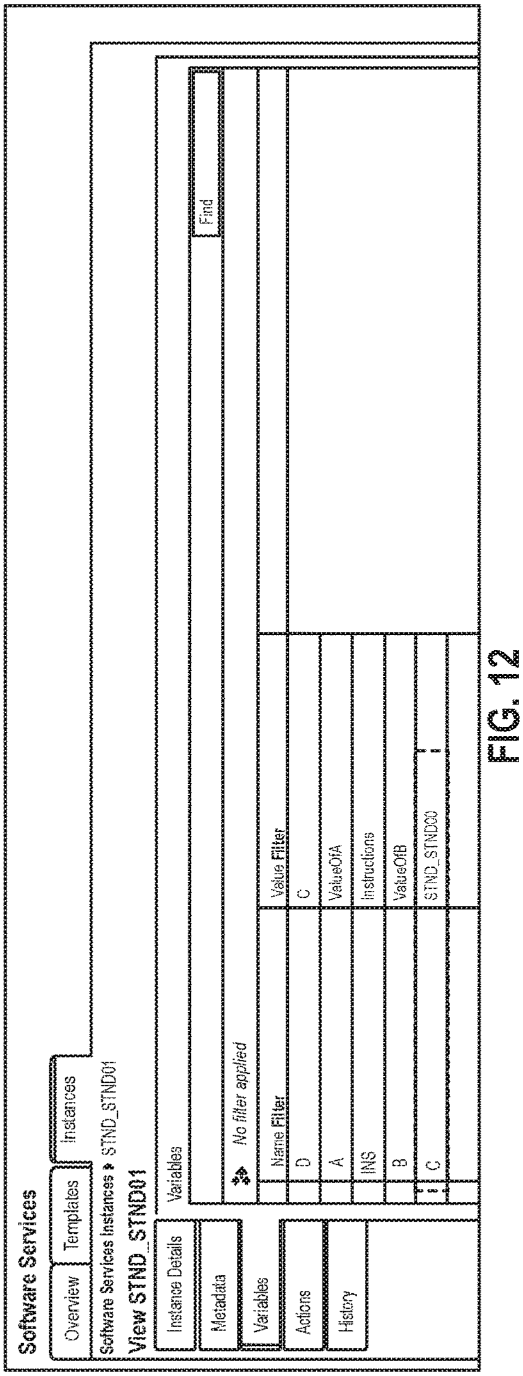
FIG. 12 illustrates a screen page which may be used to execute a composite template to provision a composite of software service instances according to one or more embodiments of the present invention.

FIGS. 10-12 illustrate a plurality of screen pages which may be used to execute a composite template to provision a composite of software service instances according to one or more embodiments. In FIG. 10, a run action can be selected to create a composite of template member instances in order to provision the template member instances. FIG. 11 illustrates the provisioning of composite template member instances. FIG. 12 illustrates a resolution of variable input-output dependencies during the provisioning of composite template member instances. Provisioning of composite template member instances where no dependencies exist amongst the composite template member instances can be executed in parallel. Provisioning of composite template member instances where one or more dependencies exist amongst the composite member instances can be executed in an associated order based on a definition within a connection that describes the dependency. Property variable input-output dependencies can be resolved dynamically during the provisioning of the composite template member instances which facilitate dynamic connectivity across various member instances of the composite template.

A composite template can be created where template members of the composite template are template members created and published in consideration of dependencies and/or sequencing amongst the template members. A connection can be created in the composite template describing each dependency amongst template members (i.e., which template outputs are connected to inputs of other templates). Accordingly, provisioning a composite of interconnected software instances using a single command (RUN) by a consumer can be employed.

By provisioning a composite of interconnected software instances using a single command (RUN), operating a complex cloud development environment with multiple services can occur in a more efficient manner because establishing the connections amongst software instances manually is tedious and time consuming. Moreover, manual entry of variables needed for services to operate together can lead to errors being introduced by the consumer when provisioning and/or deprovisioning or other actions are performed improperly, leading to unnecessary resource consumption (processing and/or storage).

Figure 13:
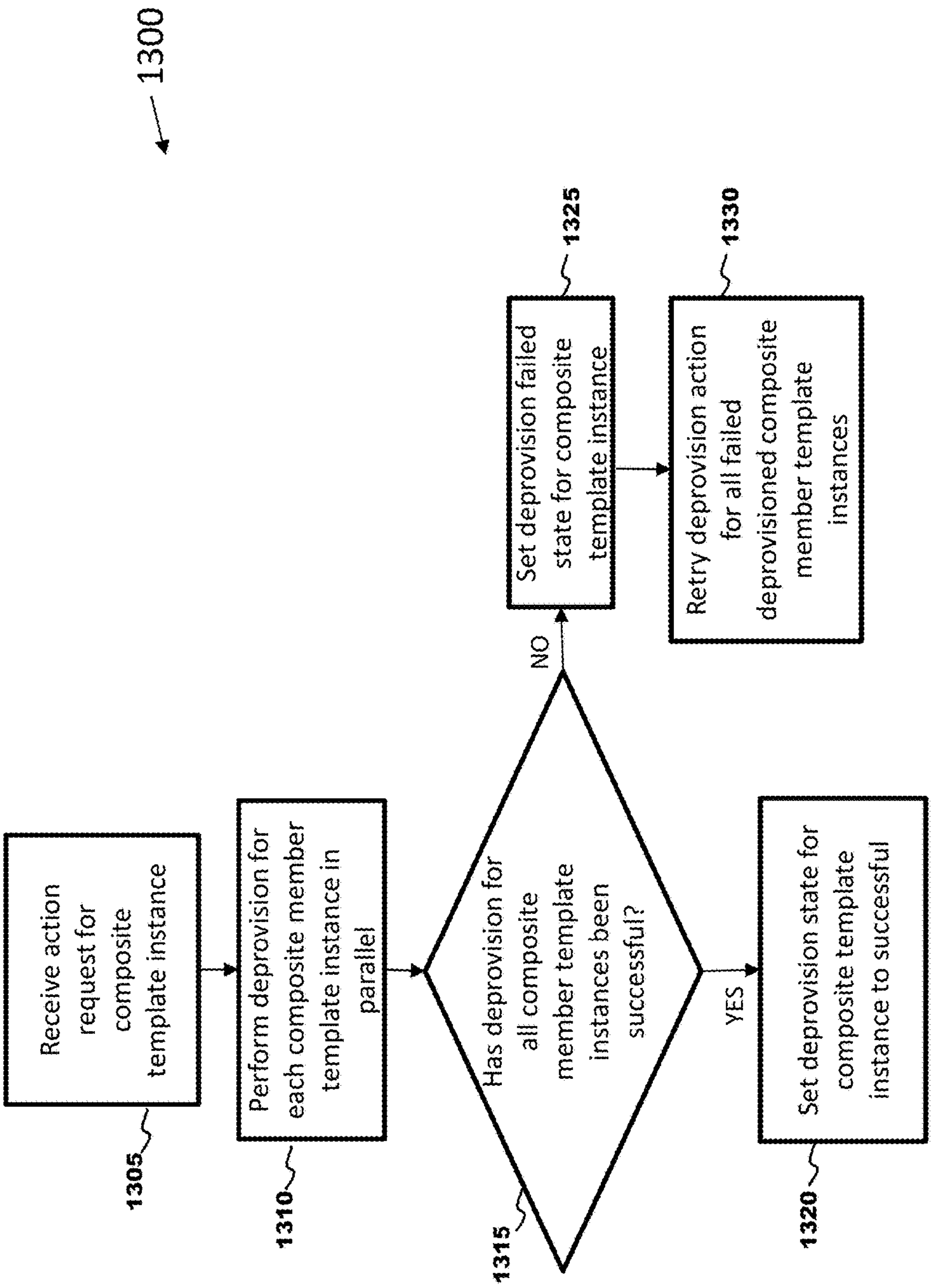
FIG. 13 is a flow diagram illustrating a method for performing one or more actions on a composite of software service instances of a composite template according to one or more embodiments of the present invention.

FIG. 13 is a flow diagram 1300 illustrating a method for performing one or more actions on a composite of software service instances of a composite template according to one or more embodiments. At block 1305, one or more actions, for example, a deprovision action on one or more provisioned instances of a composite template are requested. Accordingly, the one or more actions would be performed on all of the provisioned instances of the composite template at block 1310. At block 1315, for each template member in the composite template, a decision is made to determine whether the one or more actions to be performed on all template members of the composite template have successfully occurred. If the one or more actions to be performed on all template members are successful, the method 1300 proceeds to block 1320, where an action state for the one or more actions is set to "complete". If the one or more actions to be performed on all template members are not successful, the method 1300 proceeds to block 1325, where the action state for the one or more actions is set to "failed". The method 1300 proceeds from block 1320 to block 1330 where the requested one or more actions are retried. For example, a retry deprovision action for all composite template member instances designated as deprovision failed can be retried with each failed composite template member instance being performed in parallel thereby increasing efficiency in deprovisioning the failed composite template member instances. Also, each composite member instance can have other actions unique to its standard template definition that can be done on itself that is not ran on other instances within the composite.

Figure 14:
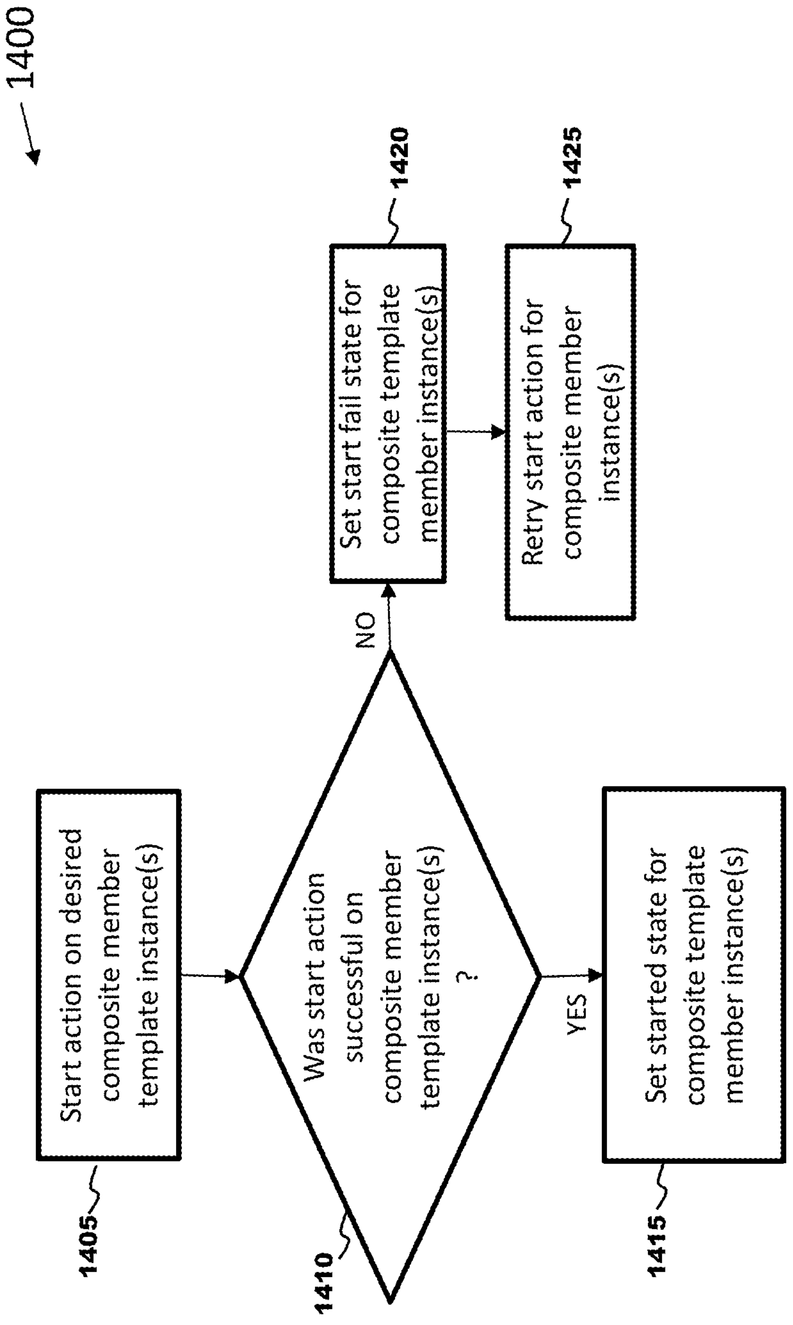
FIG. 14 is a flow diagram illustrating a method for performing an action on one or more members of a composite of software service instances of a composite template according to one or more embodiments of the present invention.

FIG. 14 is a flow diagram 1400 illustrating a method for performing one or more actions on one or more composite template members of a composite template having software instances according to one or more embodiments. At block 1405, one or more actions (ex., a start action) to be performed on one or more instances for one or more composite template member are requested. At block 1410, for the one or more composite template member instances in which the start action is to be performed, a decision is made to determine whether the start action has executed successfully. If the start action succeeded, the method 1400 proceeds to block 1415, where the state for the member instance is set to "started". If the start action failed, the method 1400 proceeds to block 1420, where the state for the member instance is set to "failed". The method 1400 proceeds from block 1420 to block 1425 where the requested action associated with the one or more composite template member instances are retried.

Figure 15:
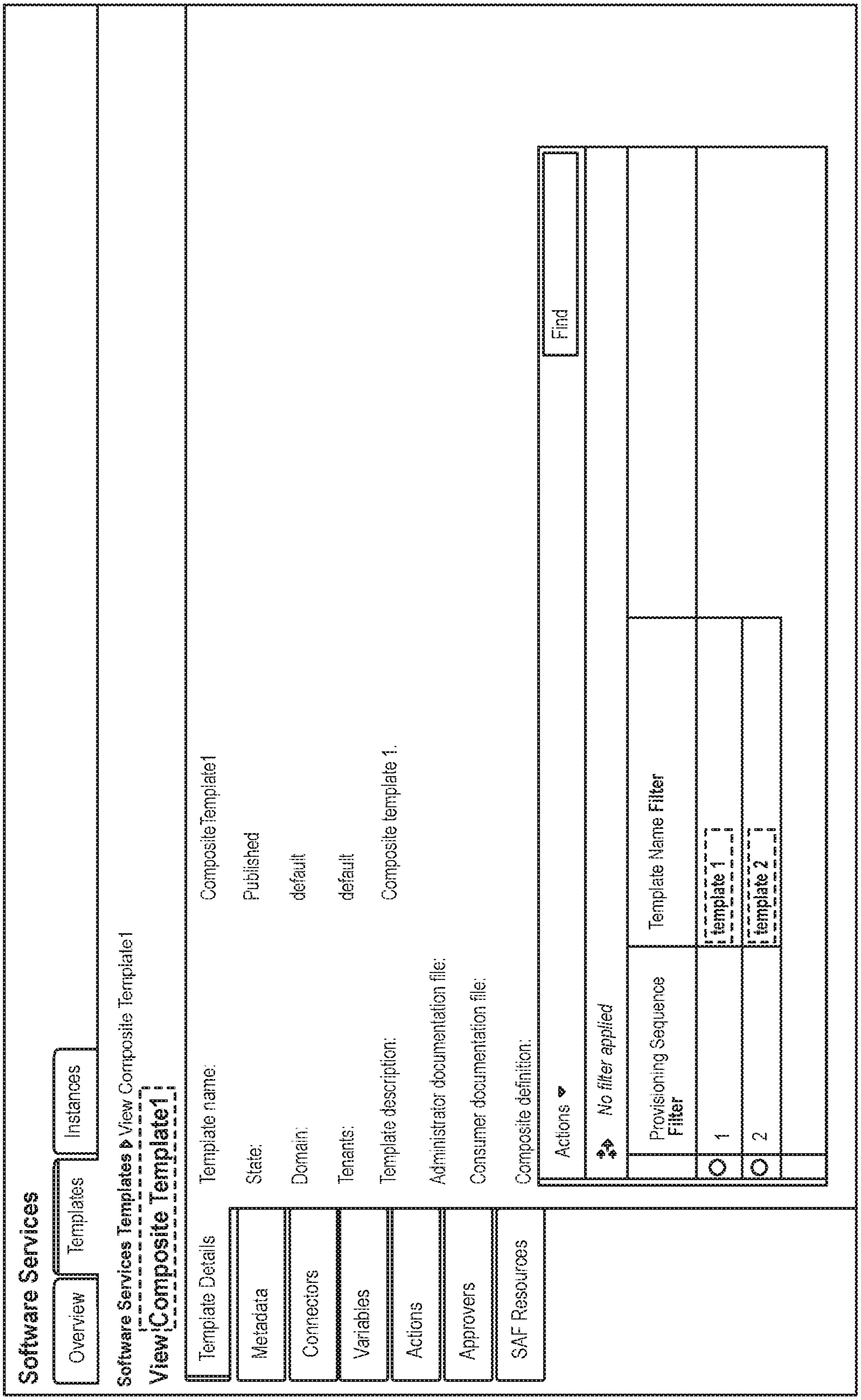
FIG. 15 illustrates a screen page which may be used to perform one or more actions on a composite template or one or more composite template members of a composite template according to one or more embodiments of the present invention.
Figure 16:
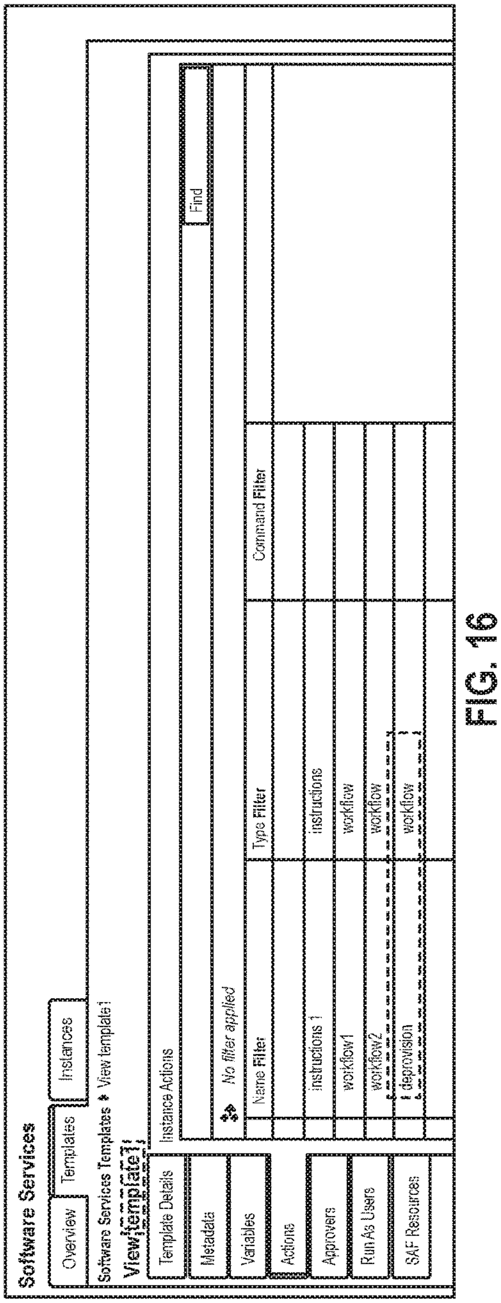
FIG. 16 illustrates a screen page which may be used to perform one or more actions on a composite template or one or more composite template members of a composite template according to one or more embodiments of the present invention.
Figure 17:
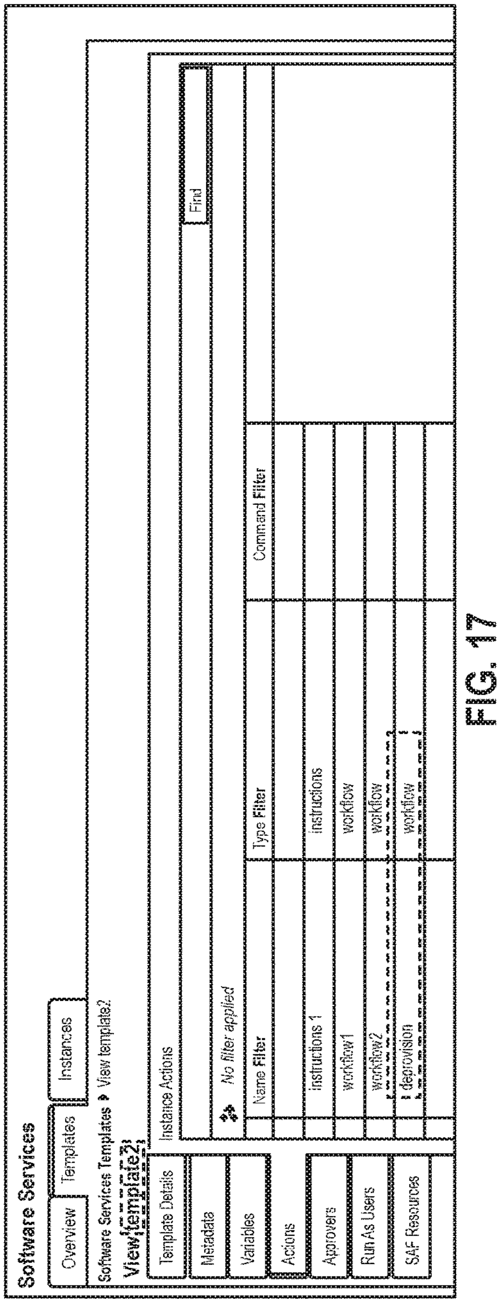
FIG. 17 illustrates a screen page which may be used to perform one or more actions on a composite template or one or more composite template members of a composite template according to one or more embodiments of the present invention.
Figure 18:
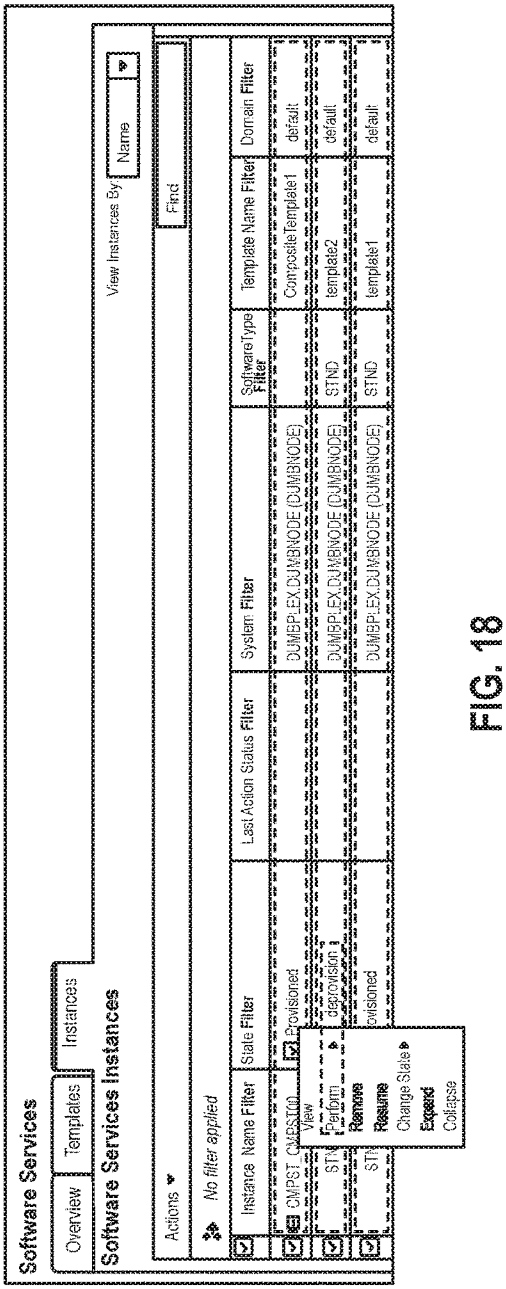
FIG. 18 illustrates a screen page which may be used to perform one or more actions on one or more members of a composite of software service instances of a composite template according to one or more embodiments of the present invention.
Figure 19:
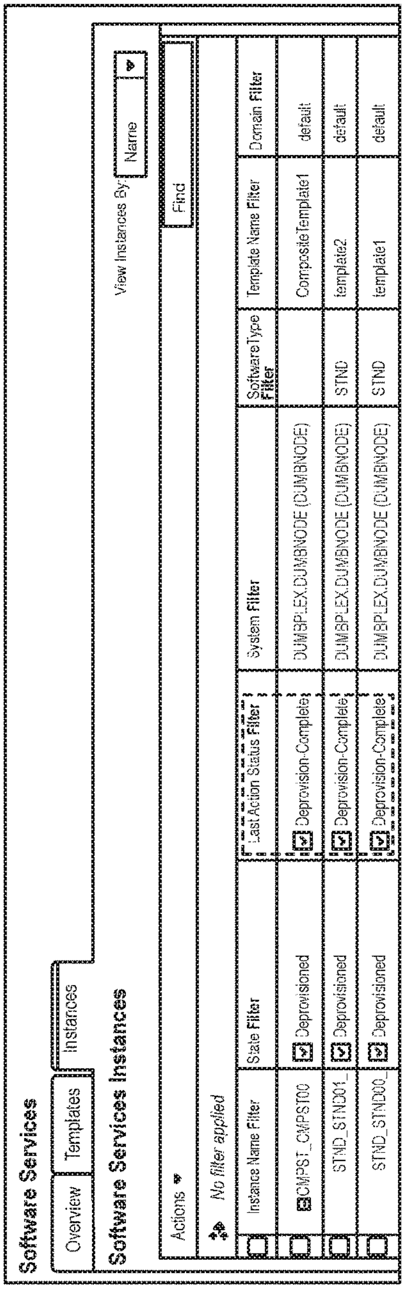
FIG. 19 illustrates a screen page which may be used to perform one or more actions on one or more members of a composite of software service instances of a composite template according to one or more embodiments of the present invention.

FIGS. 15-20 illustrate a plurality of screen pages which may be used to perform one or more actions on a composite template, one or more composite template members of a composite template, or one or more instances of a composite template according to one or more embodiments. FIG. 15 illustrates a composite template having two composite template members that are coordinated according to a provisioning sequence number. FIGS. 16 and 17 illustrate actions that can be performed on provisioned instances associated with the two composite template members. For example, actions for the two composite template members can be workflow actions, instruction actions, deprovision actions, or the like. In FIG. 18, an action can be selected from the actions in FIGS. 16 and 17 which can be associated with the two composite template members. Accordingly, a deprovisioning action of composite template member instances can be selected and performed on the designated composite template members, here composite template member 1 and composite template member 2. FIG. 19 illustrates confirmation that the selected deprovision action for the designated composite template members has completed successfully. The confirmation that all desired composite template members have been deprovisioned illustrated in FIG. 19 is useful in preventing errors and unnecessary processing resource consumption by composite template members that are no longer needed but have inadvertently left in a cloud provisioning environment.

Accordingly, actions can be performed on a composite template of member template (provisioned software) instances in which an ability to execute an action can occur for each instance via a single request. The executed action is subsequently performed according to an underlying orchestration for each composite template member instance. The specific processing defined in each template member can be executed using the same action associated with each composite template member instance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for creating one or more composite templates, the method comprising:
- receiving, by one or more processors, a request to create a composite template within a cloud environment;
- receiving, by the one or more processors, a selection of two or more template members for inclusion in the composite template;
- determining, by the one or more processors, that one or more of the selected template members have variables;
- identifying, by the one or more computer processor, one or more variables of a first template member of the selected template members;
- resolving, by the one or more processors, the variables of the selected template members for inclusion in the composite template by, for each variable of the one or more variables of the first template member:
  - determining that the variable can be resolved by a second variable belonging to a second template member of the selected template members for inclusion in the composite template,
  - wherein the second template member differs from the first template member; and
  - assigning to the variable a value of the second variable of the second template member;
- packaging, by the one or more processors, the selected template members upon resolution of variables associated with the selected template members; and
- executing the selected template members.

2. The computer-implemented method of claim 1, further comprising using a definition of connections between software service instances created from the selected template members that specify relationships between or amongst selected template members.

3. The computer-implemented method of claim 2, wherein the definition includes dependencies between or amongst the selected template members.

4. The computer-implemented method of claim 2, wherein the definition includes a sequence in which the selected template members are executed.

5. The computer-implemented method of claim 2, wherein the definition of connections is used when an instance of the composite template is created.

6. The computer-implemented method of claim 2, wherein the executing the selected template members comprises executing the selected template members in parallel in response to a determination that no relationship exists between or amongst selected template members.

7. The computer-implemented method of claim 2, wherein the selected template members are automatically executed based on the specified relationships between or amongst selected template members.

8. A system for creating one or more composite templates, comprising:

one or more processors; and at least one memory, the memory including instructions that, upon execution by at least one of the one or more processors, cause the system to perform a method for creating one or more composite templates, the method comprising:

receiving a request to create a composite template within a cloud environment;

receiving a selection of two or more template members for inclusion in the composite template;

determining that one or more of the selected template members have variables;

identifying, by the one or more computer processor, one or more variables of a first template member of the selected template members;

resolving the variables of the selected template members for inclusion in the composite template by, for each variable of the one or more variables of the first template member:

determining that the variable can be resolved by a second variable belonging to a second template member of the selected template members for inclusion in the composite template, wherein the second template member differs from the first template member; and assigning to the variable a value of the second variable of the second template member;

packaging the selected template members upon the resolution of variables associated with the selected template members; and executing the selected template members.

9. The system of claim 8, further comprising using a definition of connections between the software service instances created from the selected template members that specify relationships between or amongst selected template members.

10. The system of claim 9, wherein the definition includes dependencies between or amongst the selected template members.

11. The system of claim 9, wherein the definition includes a sequence in which the selected template members are executed.

12. The system of claim 9, wherein the selected template members are automatically executed based on the specified relationships between or amongst selected template members.

13. The system of claim 9, wherein the executing the selected template members comprises executing the selected template members in parallel in response to a determination that no relationship exists between or amongst selected template members.

14. A computer program product for creating one or more composite templates, the computer program product comprising:

a computer readable storage medium having stored thereon first program instructions executable by a processor to cause the processor to:

receive a request to create a composite template within a cloud environment;

receive a selection of two or more template members for inclusion in the composite template;

determine that one or more of the selected template members have variables;

identifying, by the one or more computer processor, one or more variables of a first template member of the selected template members;

resolve the variables of the selected template members for inclusion in the composite template by, for each variable of the one or more variables of the first template member:

determining that the variable can be resolved by a second variable belonging to a second template member of the selected template members for inclusion in the composite template, wherein the second template member differs from the first template member; and assigning to the variable a value of the second variable of the second template member;

package the selected template members upon the resolution of variables associated with the selected template members; and executing the selected template members.

15. The computer program product of claim 14, further comprising using a definition of connections between the software service instances created from the selected template members that specify relationships between or amongst selected template members.

16. The computer program product of claim 15, wherein the definition includes dependencies between or amongst the selected template members.

17. The computer program product of claim 15, wherein the definition includes a sequence in which the selected template members are executed.

18. The computer program product of claim 15, wherein the executing the selected template members comprises executing the selected template members in parallel in response to a determination that no relationship exists between or amongst selected template members.

19. The computer program product of claim 15, wherein the definition of connections is used when an instance of the composite template is created.

20. The computer program product of claim 15, wherein the selected template members are automatically executed based on the specified relationships between or amongst selected template members.

* * * * *